United States Patent [19]

Murata et al.

[11] Patent Number: 5,429,503
[45] Date of Patent: Jul. 4, 1995

[54] MAGNETIC DISPLAY PANEL INCLUDING SUBSTRATES AND MULTICELL STRUCTURE COMPRISING NONORIENTATIONAL AND UNCRYSTALLIZED POLYESTER RESIN

[75] Inventors: Yasuzo Murata; Takeo Yokoyama, both of Kanagawa, Japan

[73] Assignee: Kabushiki Kaisha Pilot, Tokyo, Japan

[21] Appl. No.: 160,165

[22] Filed: Dec. 2, 1993

[30] Foreign Application Priority Data

Dec. 3, 1992 [JP] Japan .................. 4-350284

[51] Int. Cl.⁶ .................................. B43L 1/00
[52] U.S. Cl. ....................................... 434/409
[58] Field of Search ........................ 434/409, 408

[56] References Cited

U.S. PATENT DOCUMENTS 4,368,952  1/1983  Murata et al. ............... 350/362
4,640,583  2/1987  Hoshikawa et al. .......... 350/343

Primary Examiner—Gene Mancene
Assistant Examiner—Jeffrey A. Smith
Attorney, Agent, or Firm—Sughrue, Mion, Zinn, Macpeak & Seas

[57] ABSTRACT

A magnetic display panel which includes a multicell structure between two substrates is described. The cells are filled with a dispersion liquid including magnetic particles, a dispersion medium, and a thickener or the like, and a colorant can also be included in the dispersion liquid. The multicell structure and substrates are made of nonorientational and uncrystallized polyester resin. The magnetic display panel formed by such polyester resin is superior in display definition, non-deterioration ability, strength and the like.

8 Claims, 2 Drawing Sheets

NONORIENTATIONAL AND UNCRYSTALLIZED

NONORIENTATIONAL AND UNCRYSTALLIZED

NONORIENTATIONAL AND HIGH-CRYSTALLIZED

SPHERULITE

ORIENTATIONAL AND LOW-CRYSTALLIZED

ORIENTATIONAL AND HIGH-CRYSTALLIZED

MAGNETIC DISPLAY PANEL INCLUDING SUBSTRATES AND MULTICELL STRUCTURE COMPRISING NONORIENTATIONAL AND UNCRYSTALLIZED POLYESTER RESIN

BACKGROUND OF THE INVENTION

1. Field of the Invention

This invention relates to a magnetic display panel which can display images recorded by magnetism.

2. Description of the Related Art

Generally, when magnetic force is applied by a magnet from the front direction of a magnetic display panel, magnetic particles in a dispersion liquid migrate to only a magnetized portion of the front portion of the panel in order to display. On the other hand, when magnetic force is applied from the rear direction of the magnetic display panel, the magnetic particles migrate to the rear portion of the panel so as to fade out the display.

The magnetic display panel is required to be superior in a display definition, non-deterioration ability, strength and the like. In addition, recently, it has been important to avoid exerting a bad influence on environment in the case of wasting or burning products.

The conventional magnetic display panel includes a plurality of small cells disposed between two substrates in order to clarify the display, and each cell is filled with the dispersion liquid including magnetic particles, dispersion medium, colorant, thickener and the like. The substrates and cells are formed from a synthetic resin and aluminum alloy, respectively, or both of them are formed from the synthetic resin.

If the cells are formed by a honeycomb panel made of an opaque aluminum alloy, magnetic particles attracted to the front of the panel by a magnet are parted by the opaque cells so that the display seems to be discontinuous when images are recorded by the magnet applied from the front of the panel. Therefore, its display definition cannot increase to the expected level, which is a problem.

Accordingly, the substrates and cells are formed by vinyl chloride resin to have an advantage in efficiency and commerce. While such a display does not have a problem from the point of display definition, it does have problems in that the color of the vinyl chloride resin turns to yellow with the passing of time and may be cracked at low temperature. Furthermore, the vinyl chloride resin is one cause of environment pollution because of the production of gas including chlorine in the case of burning.

SUMMARY OF THE INVENTION

As a result of studies to solve the above problems in the conventional magnetic display panel and develop a magnetic display panel which has good efficiency required for a fine magnetic display panel, if nonorientational and uncrystallized polyester resin is used to form the substrates and cells with a hydrocarbon solvent as the dispersion medium, a satisfactory and fine magnetic display panel can be obtained.

Thus, a magnetic display panel of the present invention comprises a front substrate, a rear substrate disposed opposite to the front substrate, a multicell structure having a plurality of independent spaces disposed between the substrates and being bonded to the substrates, and a dispersion liquid sealed in the spaces including magnetic particles, a dispersion medium, and a thickener, wherein the substrates and the multicell structure comprise nonorientational and uncrystallized polyester resin. A colorant can also be included in the dispersion liquid.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE INVENTION

Figure 7A:
FIG. 7(a) is an explanatory view of the molecular structure of nonorientational and uncrystallized polyester resin.
Figure 7B:
FIG. 7(b) is an explanatory view of the molecular structure of nonorientational and high-crystallized polyester resin.
Figure 7C:
FIG. 7(c) is an explanatory view of the molecular structure of orientational and low-crystallized polyester resin.
Figure 7D:
FIG. 7(d) is an explanatory view of the molecular structure of orientational and high-crystallized polyester resin.

There are four kinds of polyester resin from the point of polymer molecular structure, which are orientational and high-crystallized polyester resin, orientational and low-crystallized polyester resin, nonorientational and high-crystallized polyester resin, and nonorientational and uncrystallized polyester resin. The orientational and high-crystallized polyester resin has a polymer molecular structure such as that shown in FIG. 7(d), which has a high heat deformation temperature and is difficult to form. The orientational and low-crystallized polyester resin has a polymer molecular structure such as that shown in FIG. 7(c), which needs a biaxial stretching process to be formed and is difficult to produce in a uniform film, sheet or the like. The nonorientational and high-crystallized polyester resin has a polymer molecular structure such as that shown in FIG. 7(b), which has a poor transparency. Therefore, the nonorientational and uncrystallized polyester resin having a polymer molecular structure such as that shown in FIG. 7(a) is used to form the substrates and multicell structure in the present invention.

As examples of the nonorientational and uncrystallized resin, there are polyethylene terephthalate resins such as Teijin Tetron A-PET sheet produced by Teijin Ltd., Unitika A-PET produced by Unitika Ltd., PET (AG7K) by Kanebo Ltd., and the like.

As examples of the magnetic particles used in the present invention are fine grains of oxide magnetic material of black magnetite, γ-hematite, chrome dioxide, ferrite and the like, and fine grains of metallic magnetic material of alloys of cobalt, nickel and the like. In addition, grains can be used which are produced by a method of kneading the fine grains with resin and crushing the kneaded material to form the desired grains. Furthermore, spherical and porous black iron oxide produced by a method of reduction with hydrogen can be used. If a small volume of the magnetic particles is in the dispersion liquid, display lines are seems to be discontinuous. Accordingly, the magnetic particles is preferably included at a weight ratio of 10 parts per 100 parts of the dispersion liquid.

A polar dispersion solvent such as water, glycol or the like, or a nonpolar dispersion solvent such as an organic solvent, oil or the like, is used as the dispersion medium of the present invention. Especially, a hydrocarbon solvent is more preferable to be used as the dispersion medium than a hydrocarbon chloride so as to contribute to the protection of the environment, because the hydrocarbon solvent produces mainly water and carbon dioxide in the case of burning. For example, as the hydrocarbon solvent, there are Isopar M (trademark of Humble Oil & Refining Co.) and NA Solvent NAS-4 (trademark of Nippon Yushi K.K.).

A colorant is used in order to impart hiding power and color to the dispersion liquid. For example, any pigment such as a white pigment, any color pigment or the like is used as the colorant. Generally, the use of less than 10%, preferably less than 3%, of the colorant on the basis of the dispersion liquid gives a sufficient increase in the contrast between the dispersion liquid and the fine magnetic particles to form a sharp display. If the colorant is excessively used, the display portion formed by the magnetic fine particles becomes less distinct. However, if a thickener described later has sufficient hiding power and color, the colorant can be omitted from the dispersion liquid.

The thickener is used in order to impart a yield value to the dispersion liquid and is open to any suitable materials which can be used. For example, the thickener can be fine grains of silicic acid, silicate, alumina, calcium carbonate, magnesium carbonate, barium sulfate, benzene yellow, metallic soap, organic gelatinizer, surface active agent or the like. Any kind of thickener can be used alone or plurally at same time. The concentration of the thickener depends on the kinds of dispersion solvent and thickener used. If the concentration of the thickener is more than 2 weight % on the basis of the polar dispersion liquid or 0.5 weight % on the basis of the nonpolar dispersion liquid, the thickener imparts a yield value of more than 5 dyne/cm$^2$.

As described above, the substrates and multicell structure formed by the nonorientational and uncrystallized polyester resin are superior in transparency, light fastness and strength at a low temperature according to the molecular structure, and they produce merely water and carbon dioxide in the case of their burning. In addition, the dispersion medium, which is present in the largest ratio in the dispersion liquid, comprises hydrocarbon, so the dispersion liquid produces mainly water and carbon dioxide when the liquid is burned. Accordingly, environmental pollution is prevented.

The preferred embodiments of the invention will be further described with reference to the drawings.

Figure 1:
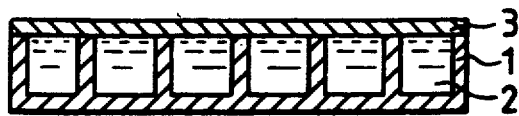
FIG. 1 is a sectional view of the structure of a magnetic display panel of the present invention.

FIG. 1 shows the structure of a magnetic display panel of the invention comprising a multicell substrate 1 wherein a substrate becomes one with a plurality of partitions forming each independent cell, a dispersion liquid 2 filling each cell and a front substrate 3 affixing to the multicell substrate 1.

Figure 2:
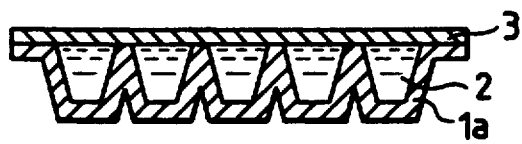
FIG. 2 is a sectional view of the structure of one modification of the magnetic display panel of the present invention.

FIG. 2 shows the structure of one modification of the magnetic display panel of the invention comprising a multicell substrate 1a having a plurality of depressions as cells, the dispersion liquid 2 filling each depression and the front substrate 3 affixing to the multicell substrate 1.

Figure 3:
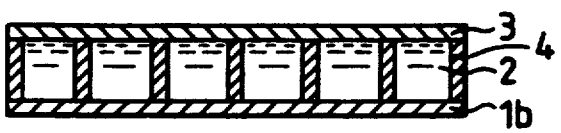
FIG. 3 is a sectional view of the structure of a second modification of the magnetic display panel of the present invention.

FIG. 3 shows the structure of a second modification of the magnetic display panel of the invention comprising multicell plates 4 in which a plurality of plates are combined each other so as to form independent cells, the dispersion liquid 2 filling each cell, and a rear substrate 1b and the front substrate 3 affixing to the cells.

Figure 4:
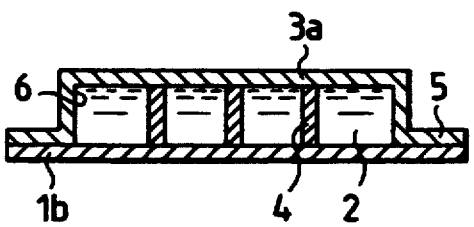
FIG. 4 is a sectional view of the structure of a third modification of the magnetic display panel of the present invention.

FIG. 4 shows the structure of a third modification of the magnetic display panel of the invention comprising an edge portion 5, a front substrate 3a having a depression 6, multicell plates 4 mounted in the depression 6 so as to form a plurality of cells, the dispersion liquid 2 filling each cell, and the rear substrate 1b covering the cells, which adheres to the front substrate 3a at the edge portion 5.

The dispersion liquid comprises magnetic particles, a dispersion medium, a thickener, and sometimes a colorant. The colorant is used in order to impart hiding power and color to the dispersion liquid. The thickener is used in order to impart a yield value to the dispersion liquid and prevent the precipitation of the magnetic particles.

Figure 6:
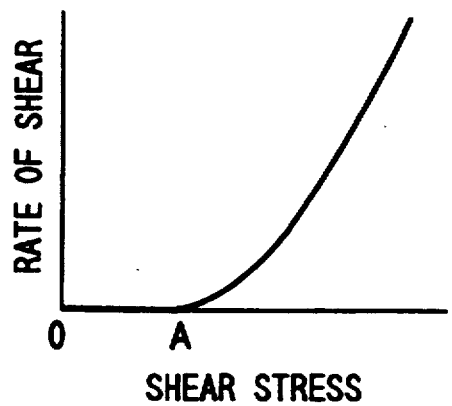
FIG. 6 is a graphical representation indicating the relationship between the rate of shear and the shear stress.

The yield value means the limit value of a flow stress which is needed to produce the flow of the liquid when a shearing stress is given to the liquid. The yield value is a point A as shown in FIG. 6.

Examples including a detailed description of the magnetic panel according to the invention will be described below; however, it should be noted that the invention is not limited thereby or thereto.

EXAMPLE 1

As the nonorientational and uncrystallized resin, Teijin Tetron A-PET sheet produced by Teijin Ltd. having a thickness of 300 μm was prepared. The Teijin Tetron A-PET sheet was formed by the vacuum forming method so as to form a front substrate which was 1.3 mm in depth, 209.5 mm in width and 299 mm in length.

Figure 5:
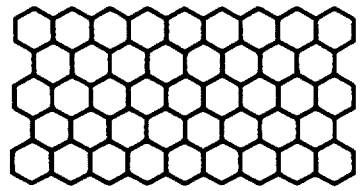
FIG. 5 is a partial plan view showing a multicell structure having a number of independent cells.

Next, honeycombed plates including a plurality of cells as shown in FIG. 5, which were made of the Teijin Tetron A-PET sheet being 50 μm in thickness, having a cell diameter of 3 mm, depth of 1.3 mm, width of 208.5 mm and length of 295 mm, were placed on the front substrate, and they were adhered together by an emulsion adhesive.

Further, the following components were mixed and kneaded by a homomixer so as to obtain a white mixing liquid.

| | |
|---|---|
| Dispersion medium: Isopar M | 97 weight % |
| Colorant: titanium oxide | 1 weight % |
| Thickener: fine-grain silicic acid | 2 weight % |

87.5 parts in weight of the white mixing liquid and 12.5 parts in weight magnetic particles, which were spherical and porous black iron oxide particles produced by Dowa Teppun Kogyo K.K., were mixed and stirred gently until being homogeneous so as to obtain the dispersion liquid.

The cells on the front substrate were filled with the dispersion liquid. A rear substrate, which was made of the A-PET having a thickness of 50 μm, was adhered to the front substrate to seal the dispersion liquid so as to obtain a magnetic display panel as shown in FIG. 4.

A permanent magnet for erasing was scanned from the rear direction of the magnetic panel so that the magnetic particles were attracted to the rear of the panel and the dispersion liquid was turned to white. Thereafter, when images were drawn by a magnetic pen comprising a permanent magnet, black and clear images were obtained.

EXAMPLE 2

A magnetic panel was made in a manner similar to that described above in Example 1 with the exception that honeycombed plates including a plurality of cells were made of Unitika A-PET produced by Unitika Ltd. Similar results were obtained.

The magnetic display panel of the present invention, including substrates and a multicell structure formed from nonorientational and uncrystallized polyester resin, is superior in display definition, non-deterioration ability, strength and the like, and if it is wasted and burned, it does not pollute environment.

Further, when the magnetic display panel in which the dispersion medium in the dispersion liquid comprises hydrocarbon is burned, it does not produce poisonous gases and thus contributes to environment protection.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A magnetic display panel comprising a front substrate, a rear substrate disposed opposite to said front substrate, a multicell structure having a plurality of independent spaces disposed between said substrates and being bonded to said substrates, and a dispersion liquid sealed in said spaces including magnetic particles, a dispersion medium, and a thickener, wherein said substrates and said multicell structure comprise nonorientational and uncrystallized polyester resin.

2. A magnetic display panel as defined in claim 1, wherein said dispersion medium is a hydrocarbon solvent.

3. A magnetic display panel as defined in claim 1, wherein said polyester resin is polyethylene terephthalate.

4. A magnetic display panel as defined in claim 1, wherein said dispersion liquid further includes a colorant.

5. A magnetic display panel as defined in claim 4, wherein said dispersion medium is a hydrocarbon solvent.

6. A magnetic display panel as defined in claim 4, wherein said polyester resin is polyethylene terephthalate.

7. A magnetic display panel as defined in claim 1, wherein said multicell structure is integrated with said rear substrate.

8. A magnetic display panel as defined in claim 1, wherein said front substrate has an edge portion and said rear substrate adheres to said front substrate at said edge portion.

* * * * *